United States Patent [19]
Frännhagen

[11] Patent Number: 5,990,659
[45] Date of Patent: Nov. 23, 1999

[54] BATTERY PACK THAT COMMUNICATES INTRINSIC INFORMATION OVER BATTERY VOLTAGE TERMINALS

[75] Inventor: Björn G. Frännhagen, Lund, Sweden

[73] Assignee: Telefonaktiebolaget LM Ericsson, Stockholm, Sweden

[21] Appl. No.: 08/941,736

[22] Filed: Oct. 1, 1997

[51] Int. Cl.[6] .................................................. H02J 7/00
[52] U.S. Cl. ................................. 320/106; 320/110
[58] Field of Search ................................. 320/106, 107, 320/110; 429/100, 121

[56] References Cited

U.S. PATENT DOCUMENTS 5,495,503  2/1996  King et al. ............................. 375/257

*Primary Examiner*—Peter S. Wong
*Assistant Examiner*—Lawrence Luk
*Attorney, Agent, or Firm*—Burns, Doane, Swecker & Mathis, L.L.P.

[57] ABSTRACT

A battery pack communicates intrinsic battery information with a battery powered device over its battery voltage terminals. The battery pack detects a start-up voltage transition across the battery voltage terminals. In response to the detected transition, a sequence generator generates a data burst representing the intrinsic battery information. While the data durst is being communicated over the battery terminals, a current limiter limits battery current supply for a current-limiting time period.

18 Claims, 2 Drawing Sheets

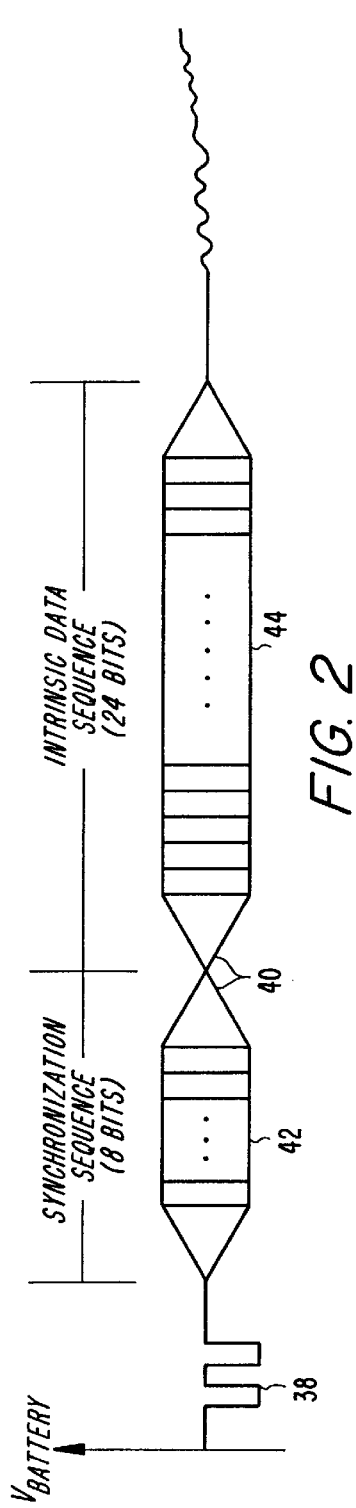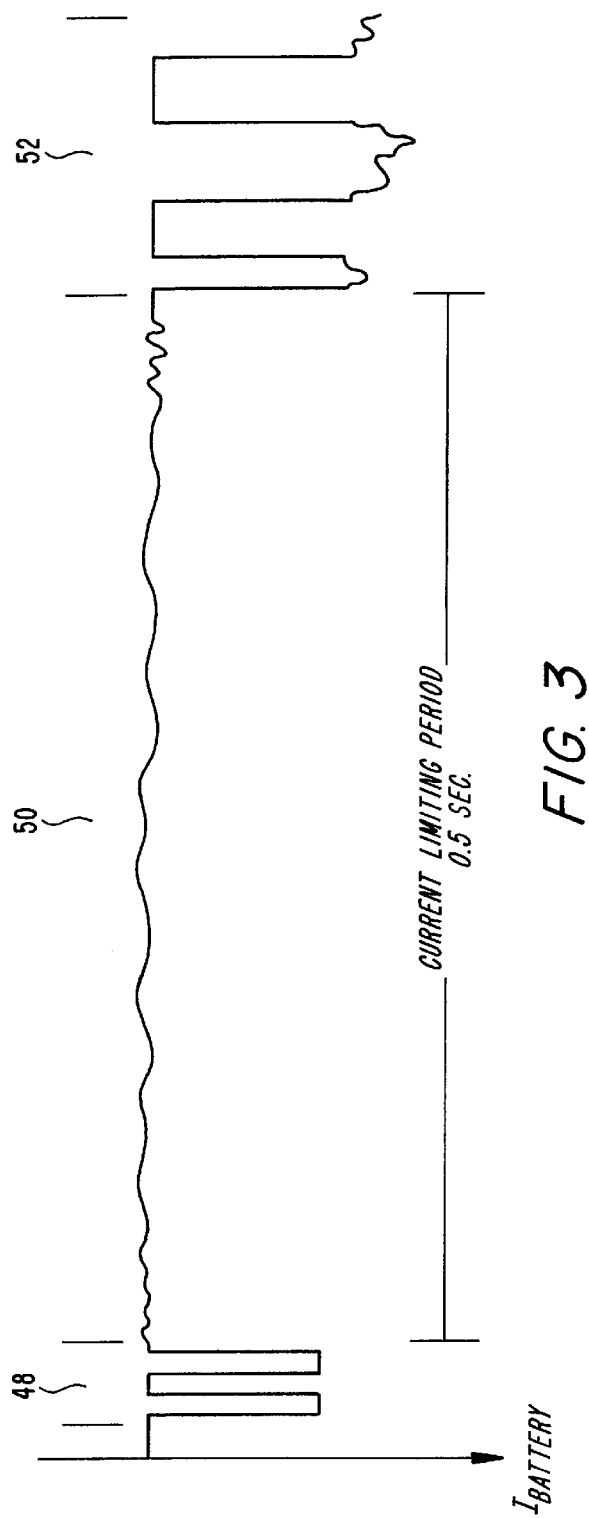

BATTERY PACK THAT COMMUNICATES INTRINSIC INFORMATION OVER BATTERY VOLTAGE TERMINALS

BACKGROUND

This invention generally relates to the field of battery packs and, more particularly, to those battery packs that communicate intrinsic information over battery voltage terminals.

Many of today's electrical and electronic devices are powered by batteries that require identification of their characteristic. This is specially true for rechargeable batteries where their chemical characteristic plays an important role in their charge and discharge requirement. For example, by identifying battery type, a battery charger may apply a suitable level of charge current for charging the battery. Alternatively by determining safety features of the battery, the charger could stop applying the charge current in time to avoid an overheating condition, which may result in a battery explosion. It is also desired to power an electronic device, such as a cellular phone, by a wide variety of battery types, such as Lithium Ion, Nickel Metal Hydrate, Nickel Cadmium, etc. The battery type identification allows the device to adjust its operating characteristic to accommodate a particular battery type.

Conventionally, various techniques have been used for communicating information between a battery and a battery powered device or a battery charger. Generally, the battery incorporates a non-volatile storage device that stores intrinsic battery information, such as battery type, safety features, model number, etc. In this way, the intrinsic battery information may be communicated over one or more battery terminals according to a predefined communication protocol, which is often a serial protocol. Usually, the device includes a microprocessor for processing the intrinsic battery information received from the battery according to a predefined program.

For communicating intrinsic information, some conventional approaches use dedicated battery terminals, which are separate from battery voltage terminals. For example, many batteries used in portable computer systems include dedicated terminals for communicating intrinsic information to and from the computer system. In smaller portable devices, such as cellular phones and the like, however, the addition of extra terminals complicates mechanical design and adds to manufacturing cost.

Another conventional approach uses the battery voltage terminals to convey intrinsic battery information to a battery charger. In this way, additional battery terminals are not necessary, since the terminals that supply the battery voltage are also used for communicating intrinsic batter information. Using a serial link, intrinsic data relating to a battery identification number and battery usage history may be communicated between the battery and the charger over the battery voltage terminals. Under this approach, the link is provided by a modulated a.c. signal, which is superimposed upon the battery voltage terminals. The modulated a.c. signal consist of a high frequency carrier, for example, 1 MHz, which is frequency or amplitude modulated for identifying two binary states. For example, a frequency modulated a.c. signal may have a first modulating frequency representing a binary state "1" and a second modulating frequency representing a binary state "0." In this way, a collection of logical signals constitute a data sequence representing intrinsic information, which is communicated between the battery and the charger over the battery voltage terminals. In yet another approach, the data sequence may be created by a high power low energy pulse imposed on the battery voltage terminals, to communicate intrinsic information stored in a low impedance battery, such as an acid battery.

Under noisy conditions, however, the conventional methods do not provide reliable communication of intrinsic battery information over the battery terminals. When a battery powered device is turned on, the noise present, due to loading conditions, for example, may distort the communication link with the battery. In order to provide reliable communication, the conventional approaches must transmit the intrinsic data continuously or periodically. This arrangement, however, results in high battery current consumption, which reduces the battery's charged life.

Therefore, there exists a need for a simple way of reliably communicating intrinsic battery information over battery voltage terminals, while consuming very little battery current.

SUMMARY

The present invention that addresses this need is exemplified in a battery pack that limits battery current supply, while a data burst carrying battery's intrinsic information is communicated over the battery voltage terminals. By limiting current supply during data communication, the distortion of the communication link between the battery pack and a powered electrical device is minimized.

Accordingly, the battery pack, which powers the electrical device, includes a battery cell that provides a battery voltage across the battery voltage terminals. A transition detector detects a voltage transition in the battery voltage. In response to the detection of the voltage transition, a sequence generator generates a data burst representing intrinsic battery information across the battery voltage terminals. While the data burst is communicated, a current limiter limits the current supply from the battery cell for a current-limiting time period, thus, avoiding spurious voltage variations across the battery voltage terminals during the transmission of intrinsic data.

According to some of the more detailed features of the present invention, the data burst comprises asynchronous voltage variations, including a synchronization sequence and an intrinsic data sequence. The synchronization sequence is used for timing adjustment to allow proper detection of the intrinsic data sequence. Preferably, the intrinsic data sequence provides information relating to battery type, battery safety features, and battery capacity. As such, the battery pack may also include a cell capacity indicator, for providing the battery capacity information.

According to other more detailed features of the invention, the voltage transition detected in the battery voltage is resulted from a sudden battery current change, for example, when the electrical device is powered up. Preferably, the current-limiting time period is longer than a time period required for communicating the data burst.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 2 is a timing diagram showing exemplary battery voltage variations of the battery pack of FIG. 1.

FIG. 3 is a timing diagram showing exemplary battery current variations of the battery pack of FIG. 1.

DETAILED DESCRIPTION

Figure 1:
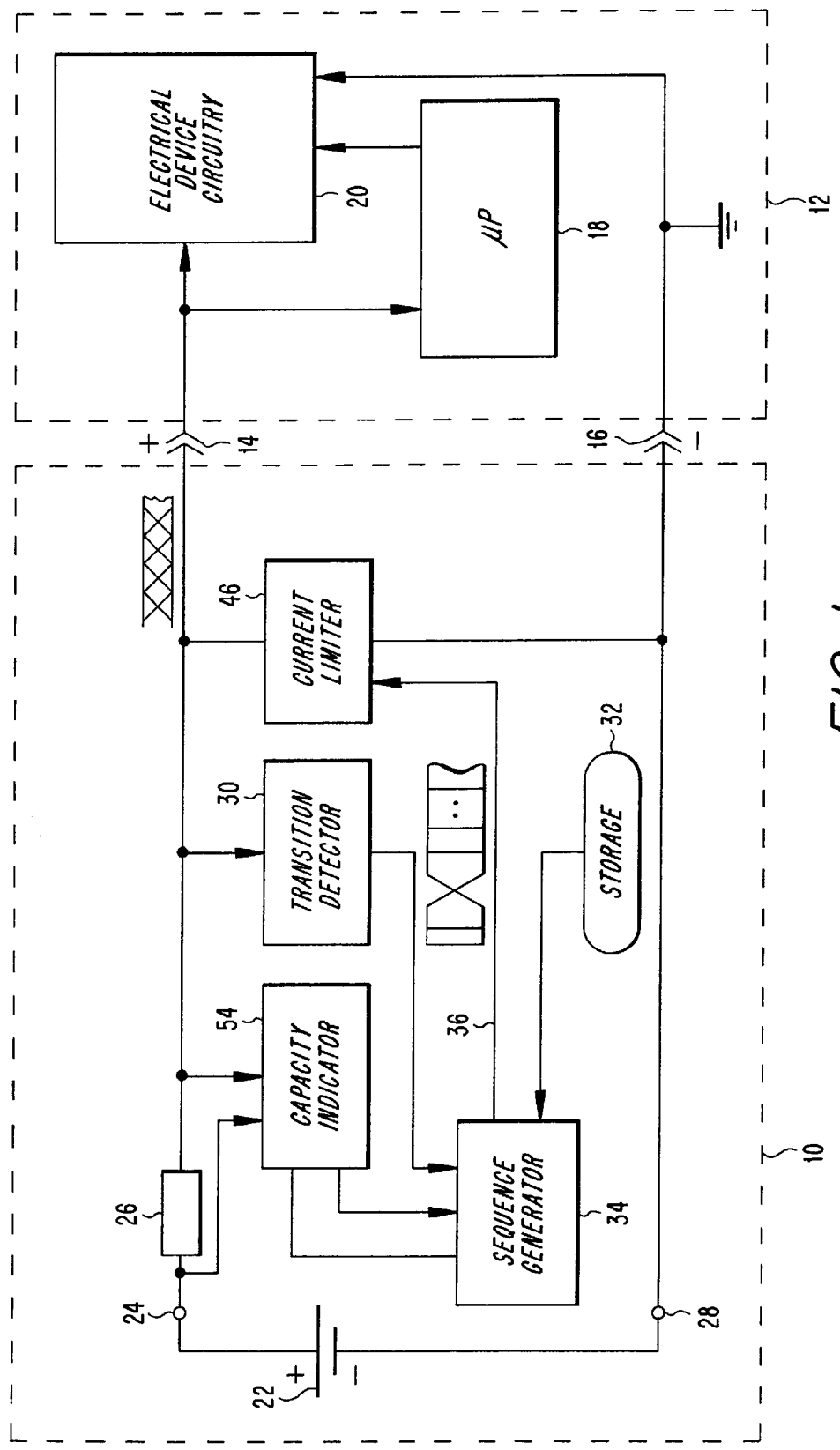
FIG. 1 is a schematic diagram of a battery pack attached to an electrical device according to the present invention.

Referring to FIG. 1, a battery pack 10 that powers an electrical device 12 via a positive battery voltage terminal 14 and a negative battery voltage terminal 16 is shown. In one embodiment of the invention, the electrical device 12 may be one of a wide variety of microprocessor controlled battery operated devices, such as a cellular telephone, which is powered by a battery voltage provided at the battery voltage terminals 14 and 16. In another embodiment, the electrical device 12 may be a microprocessor controlled charger that charges the battery pack 10 by providing charge current through the positive and negative voltage terminals 14 and 16. Accordingly, as shown in FIG. 1, the electrical device 12 includes a microprocessor 18 that controls the overall operation of the device's electrical circuitry 20. As described later, the microprocessor is also responsible for processing the intrinsic battery information, which are communicated over the battery voltage terminals 14 and 16 according to the present invention.

The battery pack 10 includes a battery cell 22, preferably a rechargeable battery cell, fabricated using any of well known battery technologies, such as Lithium Ion, Nickel Metal Hydrate, or Nickel Cadmium technologies. The battery cell 22 includes a positive lead 24 that is coupled to a resistor 26 and a negative lead 28 that terminates at the negative voltage terminal 16.

A transition detector 30, which is coupled to the resistor 26, detects battery voltage transitions from a higher to a lower level and vice versa. In an exemplary embodiment, the transition detector 30 may be a voltage comparator that compare the voltage developed at the resistor 26 with a predefined reference voltage selected for detecting the voltage transitions. In the present invention, the transition detector 30 detects an start-up voltage transition across the battery voltage terminals 14 and 16. As is well known, the start-up voltage transition develops by a sudden current change in the current drain of the battery cell 22. For example, the start-up transition may be produced by sudden loading caused by the electrical device circuitry 20, when the electrical device 12 is initially turned on.

A storage device 32 is incorporated in the battery pack 10 for storage of intrinsic battery information. Among other things, storage device 32, which is preferably a non-volatile storage device, stores battery information relating to battery type and safety features of the battery pack. For example, the intrinsic information may identify the battery pack 10 as a NiCad battery with a specified maximum charge temperature. Other manufacturing information including model number, serial number, lot number, etc., may also be stored in the storage device 32.

A sequence generator 34 generates a data burst on line 36, which carries binary data representing the intrinsic information stored in the storage device 32. Preferably, the data burst, which has a predefined protocol, is in the form of asynchronous voltage variations across the battery voltage terminals 14 and 16.

Referring to FIG. 2, a timing diagram shows start-up transitions 38, which are caused by sudden battery current changes, and data burst transitions 40, which are generated by the sequence generator 34. During an initial phase, the data burst transitions 40 include a synchronization sequence 42, having 8 bits, for example, which is used for frequency adjustment of the microprocessor 18. Subsequent to the synchronization sequence 42, the data burst transitions 40 include an intrinsic data sequence 44 consisting of a predefined number of binary bits, for example, 24 bits, which represent the intrinsic data stored in the storage device 32.

According to the present invention, in response to a start-up transition 38, for example, when the device is turned on, the sequence generator 32 generates the data burst across the battery voltage terminals 14 and 16. While the data burst is generated, a current limiter 46, shown in FIG. 1, limits the current supply from the battery cell 22 for a current-limiting time period, for example, a period of less than 0.5 second. In this way, distortions caused by spurious voltage variations across the battery voltage terminals 14 and 16 are prevented, while the data burst is being communicated. The current limiter 46 may be a current generator that is capable of generating a signal carrying the data burst in a way that can be detected by the microprocessor 18. Preferably, the data burst generated by the sequence generator 34 is applied to the current limiter 46, which includes peak generators for generating a data burst signal across the battery terminals 14 and 16.

Referring to FIG. 3 a timing diagram showing the battery current changes includes a start-up current transition period 48, a current limiting period 50, and a normal operation period 52. As shown, the start-up current transition period 48, during which current transitions caused by initial loading occurs, is concurrent with the start-up transitions 38 of FIG. 2. The current limiting period 50 is a period during which the data burst generated by the data sequence generator 34 is communicated over the battery voltage terminals 14 and 16. While the data burst is being communicated, the current limiter 46 limits the current supply of the battery cell 22, to prevent spurious transitions to distort the data burst signal.

As shown, the current-limiting time period 50 is selected to allow sufficient time for the transmission of the entire data burst. Therefore, the current-limiting time period 50 is longer than a time period required for communicating the data burst. During the current-limiting time period 50, the microprocessor 18 of the electrical device 12 is programmed to receive the data burst signal transitions across the battery voltage terminals 14 and 16. Using the synchronization sequence 42, the microprocessor 18 adjust its timing to properly receive the intrinsic data sequence 44. Once received, the microprocessor 18 decodes the intrinsic data sequence 44 for further processing. Thereafter, during the normal operation time period 52, the current limiter 46 ceases its current limiting function and allows for resumption of normal current supply from the battery cell 22.

According to another aspect of the present invention, the battery pack 10 includes a capacity indicator 54 for communicating capacity information as a part of the intrinsic data sequence 44. The capacity indicator 54 may be one of a number of well known capacity indicators that provide capacity information based on various characteristics of the battery cell 22, such as voltage, chemistry, or a combination thereof. In its simplest form, the capacity indicator 54 indicates an empty capacity level, when the voltage across the battery cell 22 drops below a low voltage threshold. When the battery cell 22 is fully charged, as indicated by a high voltage threshold, the battery capacity indicator 54 indicates a full capacity level. In between the empty and full capacity, the battery capacity indicator 54 may represent capacity with a predefined resolution, such as empty, quarter-full, half-full, three-quarter full, and full. In response to a capacity request, the capacity indicator 54 provides the capacity information to the sequence generator 34. The sequence generator 34 encodes the capacity information into the intrinsic data sequence, which will be communicated along with other intrinsic data over the battery voltage terminals 14 and 16.

The battery pack circuitry for implementing the present invention may be provided cost effectively by an application specific integrated circuit. It would be appreciated, however, that many of the functions performed by the method of communicating battery intrinsic information may be carried out by a micro-controller disposed in the battery pack. For example, the micro-controller may be programmed to perform the steps of detecting start-up transitions, generating the data burst, and signaling the duration of time, when the battery current supply is limited. The battery capacity measurement function may also be performed by such micro-controller. Because of the its programmability, the micro-controller approach allows more flexibility for changing operating functions.

From the foregoing description it would be appreciated that the present invention introduces accuracy into the transmission of intrinsic battery information over the voltage terminals of a battery. By limiting the current supply of the battery cell 22, while the intrinsic data is being communicated, the present invention minimizes the affects of spurious noise that distort the communicated data. This allows the present invention to transmit the intrinsic data only once during an initial start-up phase, thus, avoiding repeated transmissions that increase battery current drain. As such, the present invention provides a simple and accurate data communication mechanism over the battery voltage terminals using minimum current drain.

Although the invention has been described in detail with reference only to the presently preferred embodiment, those skilled in the art will appreciate that various modifications can be made without departing from the invention. Accordingly, the invention is defined only by the following claims which are intended to embrace all equivalents thereof.

What is claimed is:

1. A battery pack for powering an electrical device, comprising:

at least one battery cell that provides a battery voltage;

battery voltage terminals that provide the battery voltage to the electrical device;

a transition detector that detects a voltage transition in the battery voltage;

a sequence generator that is responsive to the transition detector for generating a data burst across the battery voltage terminals; and a current limiter that limits the current supply of the battery cell for a current-limiting time period, while the data burst is generated.

2. The battery pack of claim 1, wherein the data burst comprises asynchronous voltage variations across the battery voltage terminals.

3. The battery pack of claim 1, wherein the data burst includes a synchronization sequence.

4. The battery pack of claim 1, wherein the data burst includes an intrinsic data sequence.

5. The battery pack of claim 4, wherein the intrinsic data sequence provides information relating to battery type.

6. The battery pack of claim 4, wherein the intrinsic data sequence provides information relating to battery safety features.

7. The battery pack of claim 4, wherein the current-limiting time period is longer than a time period required for communicating the data burst.

8. The battery pack of claim 4 further including a cell capacity indicator, wherein the intrinsic data sequence provides information relating to battery capacity.

9. The battery pack of claim 1, wherein the voltage transition detected in the battery voltage is resulted from a sudden battery current change.

10. A method for powering an electrical device by a battery having battery voltage terminals for providing a battery voltage, comprising the steps of:

detecting a voltage transition in the battery voltage;

generating a data burst across the battery voltage terminals, when the voltage transition is detected; and limiting the current supply of the battery for a current-limiting time period, while the data burst is generated.

11. The method of claim 10, wherein the data bursts comprises asynchronous voltage variations across the battery voltage terminals.

12. The method of claim 10, wherein the data burst includes a synchronization sequence.

13. The Method of claim 10, wherein the data burst includes an intrinsic data sequence.

14. The Method of claim 13, wherein the intrinsic data sequence provides information relating to battery type.

15. The method of claim 13, wherein the intrinsic data sequence provides information relating to battery safety features.

16. The method of claim 13, wherein the current-limiting time period is longer than a time period required for communicating the data burst.

17. The method of claim 13, further including the step of measuring cell capacity, wherein the intrinsic data sequence provides information relating to battery capacity.

18. The method of claim 10, wherein the voltage transition detected in the battery voltage is resulted from a sudden battery current change.

* * * * *